(12) United States Patent
Dhiman et al.

(10) Patent No.: US 12,386,878 B2
(45) Date of Patent: Aug. 12, 2025

(54) AUTOMATIC ENABLING OF ACCESSIBILITY FEATURES BASED ON PROFILING AND DETECTION OF DISABILITY

(71) Applicant: Adeia Guides Inc., San Jose, CA (US)

(72) Inventors: Rohit Dhiman, Uttarakhand (IN); Srishti Sharma, Bihar (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/187,010

(22) Filed: Feb. 26, 2021

(65) Prior Publication Data

US 2022/0277036 A1 Sep. 1, 2022

(51) Int. Cl.
- *G06F 16/00* (2019.01)
- *G06F 7/00* (2006.01)
- *G06F 16/435* (2019.01)

(52) U.S. Cl.
CPC .................. *G06F 16/436* (2019.01)

(58) Field of Classification Search
CPC .................................... G06F 16/436
USPC ........................................ 707/769
See application file for complete search history.

(56) References Cited

U.S. PATENT DOCUMENTS

| | | | |
|---|---|---|---|
| 7,761,892 B2 | 7/2010 | Ellis et al. | |
| 9,014,546 B2 | 4/2015 | Shimy et al. | |
| 10,757,216 B1* | 8/2020 | Van Vliet | H04L 67/52 |
| 2012/0124456 A1* | 5/2012 | Perez | H04N 21/44218 |
| | | | 715/200 |
| 2016/0072857 A1* | 3/2016 | Seto | G06Q 10/103 |
| | | | 709/204 |
| 2019/0018478 A1* | 1/2019 | Shintani | G06F 3/167 |
| 2019/0191201 A1* | 6/2019 | Li | H04N 21/42201 |
| 2020/0110532 A1* | 4/2020 | Mani | G06V 40/113 |
| 2020/0356656 A1* | 11/2020 | Chhabra | G06F 9/451 |
| 2021/0043109 A1* | 2/2021 | Mese | G09B 21/008 |

\* cited by examiner

*Primary Examiner* — Raquel Perez-Arroyo
(74) *Attorney, Agent, or Firm* — Haley Guiliano LLP

(57) ABSTRACT

This disclosure is generally directed to interactive media guidance applications. In particular, methods and systems are provided herein for automatic detection and identification of disabled users near media devices to provide accessible media content.

Accordingly, in view of the foregoing, the present disclosure provides a method for allowing disabled users to be detected and identified by a media device automatically. The result is improved access to media content and an enhanced multimedia experience for people with disabilities and improved personalization when it comes to media systems. This can lead towards a hyper-personalized experience tailored towards all users, not just non-disabled users.

17 Claims, 5 Drawing Sheets

AUTOMATIC ENABLING OF ACCESSIBILITY FEATURES BASED ON PROFILING AND DETECTION OF DISABILITY

BACKGROUND

This disclosure is generally directed to interactive media guidance applications. In particular, methods and systems are provided herein for automatic detection and identification of disabled users near media devices to provide accessible media content.

SUMMARY

There is a clear and growing demand for accessible media systems. A person without any disability is capable of easily interacting with entertainment systems, particularly when it comes to choosing and watching content almost immediately without having to overcome any barriers. However, disabled people face significant obstacles when accessing entertainment. Whereas, in many cases, in order to activate specific accessibility features to accommodate for user disabilities, users are typically required to input a request manually. In other cases, someone else is required to execute the process before the disabled users can use and interact with the technology themselves. Additionally, providing accessibility features is becoming more common especially for web content, e.g., through the web content accessibility guidelines.

Evidently, traditional media systems are ineffective at targeting and tailoring content to users in many situations, particularly when there is at least one disabled user present. Thus, there is a need for systems and methods capable of providing disabled users with enhanced user experiences.

According to a first aspect, a method is provided for providing accessible media content to users with disabilities. The method comprises detecting, with a detection mechanism, a first user within a detection region relative to a media system. The method further comprises identifying the first user and retrieving, from a database of user profiles, a first user profile in response to identifying the first user. The method further comprises determining whether the first user has a disability based on the retrieved first user profile and/or using the detection mechanism. In response to determining that the first user has a disability, the method further comprises determining one or more accessibility features associated with the disability of the first user. The method further comprises activating the one or more accessibility features.

Accordingly, in view of the foregoing, the present disclosure provides a method for allowing disabled users to be detected and identified by a media device automatically. The result is improved access to media content and an enhanced multimedia experience for people with disabilities and improved personalization when it comes to media systems. This can lead towards a hyper-personalized experience tailored towards all users, not just non-disabled users.

In some embodiments, the method further comprises defining the detection region for the media system having the detection mechanism, wherein the detection region is within a detectable range, and wherein the detection region is smaller than the detectable range, and storing parameters of the detection region for the media device.

In some embodiments, the step of determining one or more accessibility features associated with the disability for the first user is based on the retrieved first user profile and/or a database of accessibility features.

In some embodiments, the method may further comprise a step of detecting, with the detection mechanism, at least a second user within the detection region relative to the media system. The method may further comprise identifying the second user and retrieving, from the database of user profiles, a second user profile in response to identifying the second user. The method may further comprise determining whether the second user has a disability based on the retrieved second user profile and/or using the detection mechanism.

In some embodiments, the media system may be configured to detect, using the user detection mechanism, disabilities or impairments of any detected user within the defined detection region of the media device. For example, the media device may be configured to detect or determine visual impairment, hearing impairment, speaking impairment, physical disability or any other type of disability.

In some embodiments, the method may further comprise, in response to determining that the second user has a disability, determining one or more accessibility features associated with the disability of the second user. The method may further comprise determining whether any one of the accessibility features associated with the disability of the second user conflicts with the accessibility features associated with the disability of the first user. The method may further comprise activating any one or more non-conflicting accessibility features for the second user.

By using a detection mechanism, the media system can be enriched with capabilities, e.g., of facial recognition and biometrics that can be processed such that media content can be accessed by users with disabilities with the same level of convenience as non-disabled users, e.g., by activating accessibility features for user disabilities based on the detection and/or user profile.

In some embodiments, the method may further comprise a step of detecting, with the detection mechanism, one or more additional users within the detection region relative to the media system. The method may further comprise identifying at least one of the one or more additional users having a user profile and defining one or more group preferences between the first user and the one or more additional users.

In some embodiments, the one or more group preferences comprise requesting confirmation from the first user and/or the one or more additional users to activate one or more of the one or more accessibility features and/or automatically activating one or more of the one or more accessibility features.

In some embodiments, the method may further comprise a step of recommending alternative media assets based on the one or more accessibility features. In some embodiments, the step of recommending alternative media assets is based on previously consumed media assets when the one or more accessibility features were active.

According to a second aspect, a system is provided for providing accessible media content to users with disabilities. The system comprises means for detecting, with a detection mechanism, a first user within a detection region relative to a media system. The system further comprises means for identifying the first user and means for retrieving, from a database of user profiles, a first user profile in response to identifying the first user. The system comprises means for determining whether the first user has a disability based on the retrieved first user profile and/or using the detection mechanism. The system comprises, in response to determining that the first user has a disability, means for determining one or more accessibility features associated with the disability of the first user. The system comprises means for activating the one or more accessibility features.

According to a third aspect, a non-transitory computer-readable medium is provided comprising non-transitory computer-readable instructions encoded thereon for providing accessible media content to users with disabilities. The instructions comprise instructions for detecting, with a detection mechanism, a first user within a detection region relative to a media system. The instructions further comprise instructions for identifying the first user and instructions for retrieving, from a database of user profiles, a first user profile in response to identifying the first user. The instructions comprise instructions for determining whether the first user has a disability based on the retrieved first user profile and/or using the detection mechanism, and in response to determining that the first user has a disability, instructions for determining one or more accessibility features associated with the disability of the first user. The instructions comprise instructions for activating the one or more accessibility features.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which.

Figure 1:
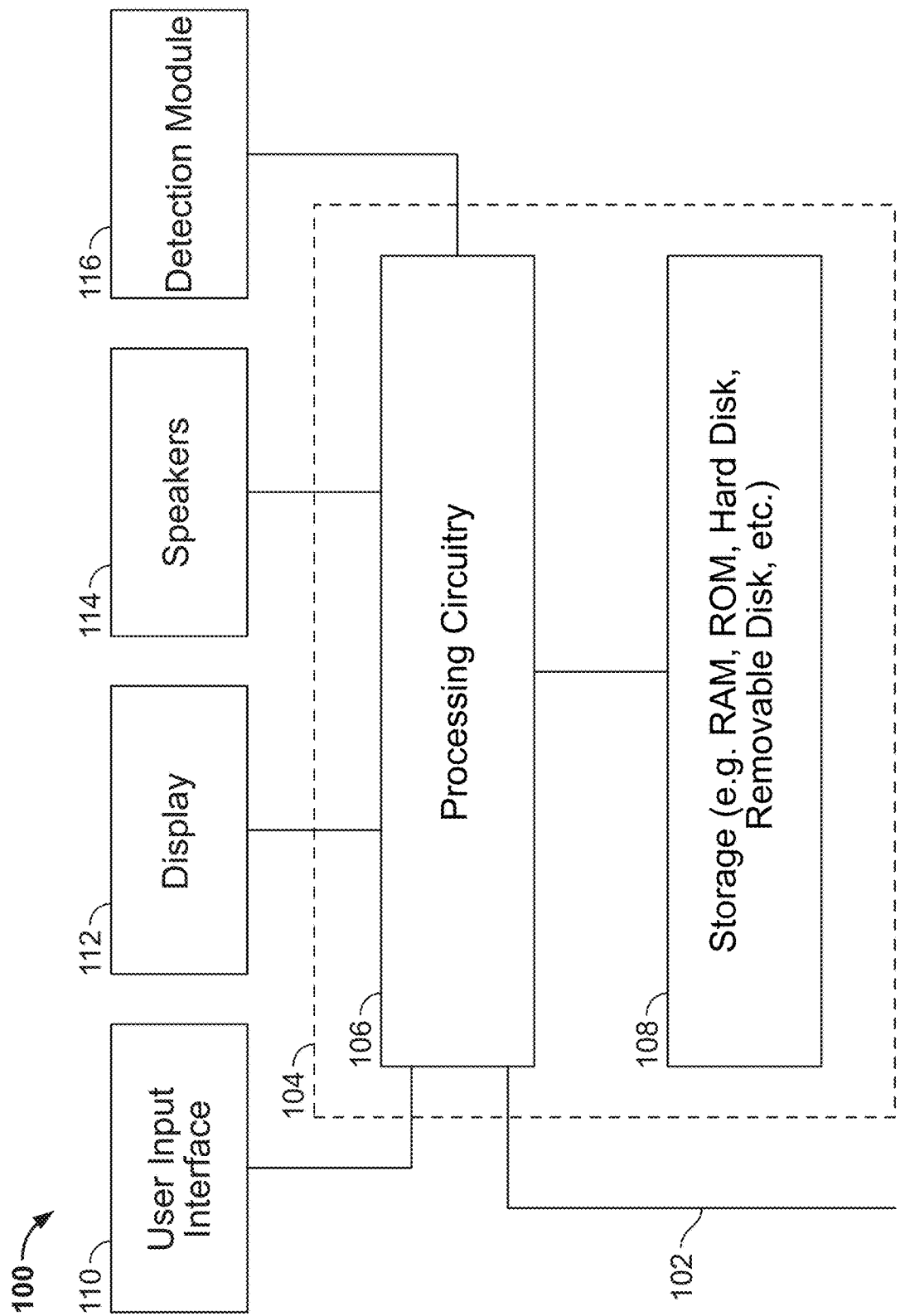
FIG. 1 shows an illustrative depiction of an example user device, in accordance with some embodiments of the present disclosure.

The figures herein depict various embodiments of the disclosed invention for purposes of illustration only. It will be appreciated that additional or alternative structures, systems and methods may be implemented within the principles set out by the present disclosure.

DETAILED DESCRIPTION

In the context of accessibility, this disclosure focusses on highlighting the barriers and solutions to digital or media accessibility. More particularly, the teachings of this disclosure seek to fill the gap in accessibility between disabled and non-disabled users by providing an easily accessible media system that can be convenient to everyone. Furthermore, this disclosure teaches towards the wide availability of accessibility features and equal access to audio and visual media content for all users through an enhanced multimedia system.

According to a first aspect, there is provided a method for providing accessible media content to users with disabilities. The method comprises detecting, with a detection mechanism, a first user within a detection region relative to a media system. The method further comprises identifying the first user and retrieving, from a database of user profiles, a first user profile in response to identifying the first user. The method further comprises determining whether the first user has a disability based on the retrieved first user profile and/or using the detection mechanism. In response to determining that the first user has a disability, the method further comprises determining one or more accessibility features associated with the disability of the first user. The method further comprises activating the one or more accessibility features.

Accordingly, in view of the foregoing, the present disclosure provides a method for allowing disabled users to be detected and identified by a media device automatically. The result is improved access to media content and an enhanced multimedia experience for people with disabilities and improved personalization when it comes to media systems. This can lead towards a hyper-personalized experience tailored towards all users, not just non-disabled users.

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and "media content" should be understood to mean an electronically consumable user asset, such as a live televise program, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client-server based embodiments, control circuitry 104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other.

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals.

The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touchscreen, touchpad, stylus input, joystick, voice recognition interface, or other user input interfaces.

Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be stand-alone units. The audio component of videos and other content displayed on display 112 may be played through speakers 114. In some embodiments, the audio may be distributed to a receiver (not shown), which processes and outputs the audio via speakers 114.

User equipment device 100 may also incorporate or be accessible to one or more other modules 116. For example, a detection module 116 including various components (e.g., a video detection component, an audio detection component, etc.) or one or more sensory modules (e.g., a contact touch sensory module, a proximity touch sensory module, etc.).

The media guidance application may be implemented using any suitable architecture. For example, it may be a stand-alone application wholly-implemented on user equipment device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves using a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
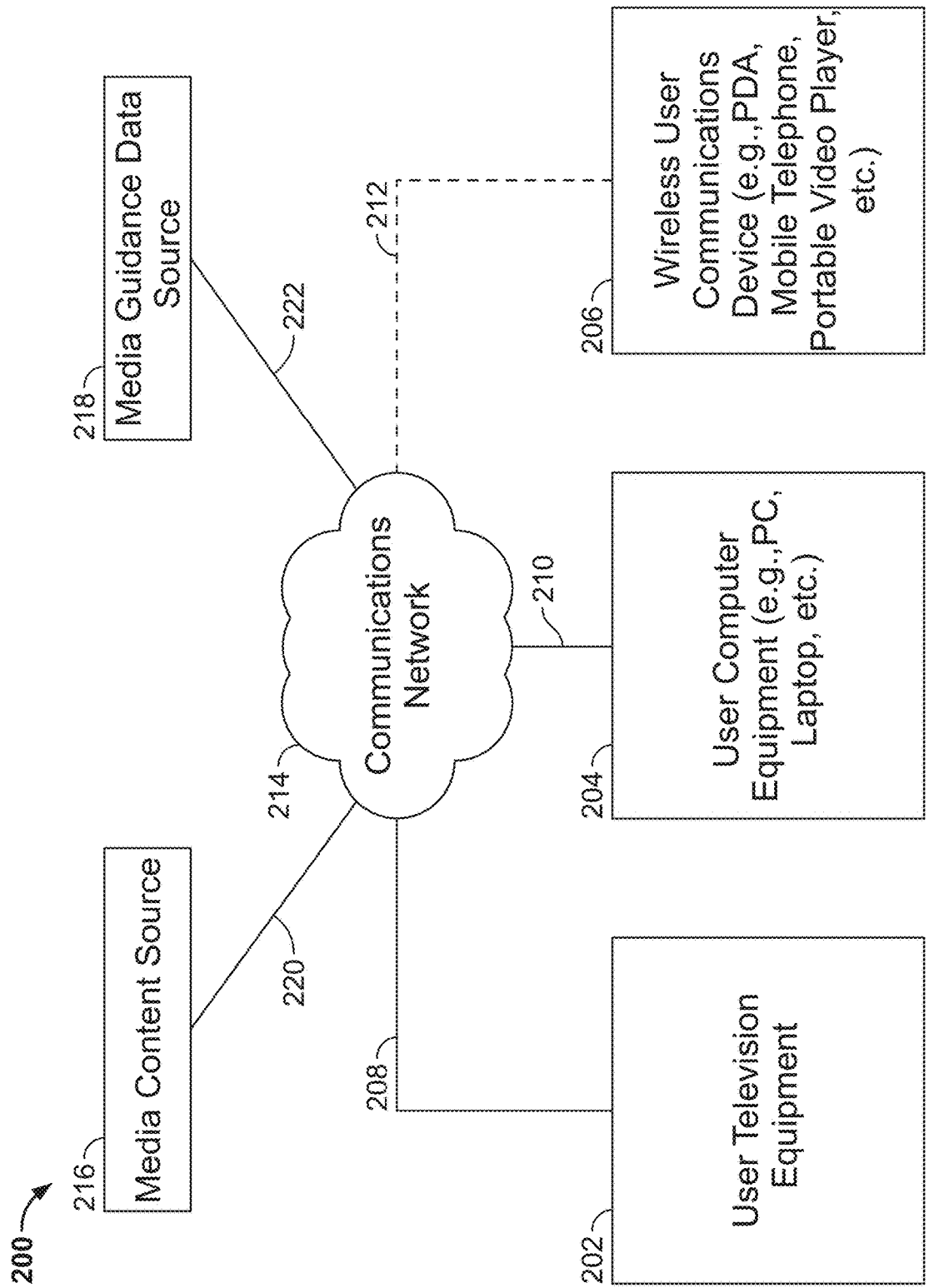
FIG. 2 shows a block diagram of an illustrative user equipment system, in accordance with some embodiments of the present disclosure.

User equipment device 100 of FIG. 1 can be implemented in system 200 of FIG. 2 as user television equipment 202, user computer equipment 204, wireless user communications device 206, or any other type of user equipment suitable for accessing content. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 1 may not be classified solely as user television equipment 202, user computer equipment 204, or a wireless user communications device 206. For example, user television equipment 202 may, like some user computer equipment 204, be Internet-enabled allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there may be more than one of each type of user equipment device but only one of each is shown in FIG. 2 to avoid overcomplicating the drawing. In addition, each user may utilize more than one type of user equipment device and also more than one of each type of user equipment device. In some embodiments, a user equipment device (e.g., user television equipment 202, user computer equipment 204, wireless user communications device 206) may be referred to as a "second screen device" or "secondary device".

The user may also set various settings to maintain consistent media guidance application settings, e.g., volume settings, across in-home devices and remote devices. Settings include programming preferences that the guidance application utilizes to make programming recommendations, display preferences, and other desirable guidance settings. For example, if a user sets a preferred volume level as a favorite volume level on, for example, a web site mobile phone, the same settings would appear on the user's in-home devices (e.g., user television equipment and user computer equipment), if desired. Therefore, changes made on one user equipment device can change the guidance experience on another user equipment device, regardless of whether they are the same or a different type of user equipment device.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile voice or data network (e.g., a 4G or LTE network), cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths, but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (e.g., a television broadcaster, a Webcast provider, etc.) or may not be the originator of content (e.g., an on-demand content provider, an Internet provider of content of broadcast programs for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Media guidance applications may be, for example, standalone applications implemented on user equipment devices. For example, the media guidance application may be implemented as software or a set of executable instructions which may be stored in storage 108, and executed by control circuitry 104 of a user equipment device 100. In some embodiments, media guidance applications may be client-server applications where only a client application resides on the user equipment device, and server application resides on a remote server. For example, media guidance applications may be implemented partially as a client application on control circuitry 104 of user equipment device 100 and partially on a remote server as a server application (e.g., media guidance data source 218) running on control circuitry of the remote server. When executed by control circuitry of the remote server (such as media guidance data source 218), the media guidance application may instruct the control circuitry to generate the guidance application displays and transmit the generated displays to the user equipment devices. The server application may instruct the control circuitry of the media guidance data source 218 to transmit data for storage on the user equipment. The client application may instruct control circuitry of the receiving user equipment to generate the guidance application displays.

Content and/or media guidance data delivered to user equipment devices 202, 204, and 206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT. In addition to content and/or media guidance data, providers of OTT content can distribute media guidance applications (e.g., web-based applications or cloud-based applications), or the content can be displayed by media guidance applications stored on the user equipment device.

Media guidance system 200 is intended to illustrate various approaches, or network configurations, by which user equipment devices and sources of content and guidance data may communicate with each other for the purpose of accessing content and providing media guidance. The embodiments described herein may be applied in any approach that does not deviate from the teachings of this disclosure, for example in a system employing an approach for delivering content and providing media guidance.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1.

In example embodiments, a media system, e.g., a media device or a media guidance application, is provided with a detection mechanism. Additionally or alternatively, a separate module may act as the detection mechanism. The detection mechanism can be used to detect users, e.g., users sitting opposite the detection mechanism or the media system, whenever the media device or media guidance application is switched on, for example. Detection of users may also be continuous.

The detection mechanism is operable to detect users within a range relative to the media device. A detection region that is within the detection range can be defined and/or adjusted, and it can be determined whether users are within the detection region. Upon user detection, the media device or a media guidance application may be activated, for example, or the users may be logging in to one or more user profiles. For example, the detected user may be automatically logged in to the media guidance application when the user is detected by the detection mechanism and identified by the media system. In this way, the media guidance application can effectively tailor media content and the media features to users, including users with disabilities, in ways that will be further described by way of this disclosure.

The media system can be connected to a database of user profiles that can allow a user to move from one device to another device and still continue accessing content seamlessly without requiring the user to affirmatively log in to the separate devices, for example. Thus, this allows the system to require little or no manual intervention from the user, which can be a significant factor when it comes to the accessibility of entertainment systems for disabled people and the quality of their user experience when interacting with media devices and media content.

The detection region of the media system may be configurable. Configurations of the detection region may allow a user to define a proximity, range and/or region near a media device such that, when a user is within the proximity, range and/or region, the user will be considered an active user of the media device. For example, a user may define the boundaries of the detection region, for example, within the defined boundaries a user may be considered an active user at the associated device; otherwise the user will not be considered an active user at the associated device. As a further example, if a user sits down in front of a first device and is detected within the configured region, the user may be automatically logged in to the device so that, for example, the user's personal settings are readily available to the user.

In some embodiments, a user may configure the techniques the media system may use to detect, track movement of, and/or identify users within the system's or device's detection region using the detection mechanism. For example, the media system may be configured to detect, track movement of, and/or identify a user using any suitable biometric recognition technique, any suitable device recognition technique, any suitable radar and/or sonar recognition technique, and/or any other suitable recognition technique. In some embodiments, the detection mechanism may also have the ability to detect disabilities that can be easily detected, e.g., hearing impairment. For example, hearing impairment may be detected based on a detected hearing aid using image recognition or, in another example, a user may be determined to have an issue with hearing if the user is determined to be always increasing the volume to levels over a set volume threshold.

In some embodiments, the media system may be configured to detect, using the user detection mechanism, disabilities or impairments of any detected user within the defined detection region of the media device. For example, the media device may be configured to detect or determine visual impairment, hearing impairment, speaking impairment, physical disability or any other type of disability.

In some embodiments, the detecting mechanism may utilize any suitable image processing, video processing, and/or computer vision technique and/or any other suitable technique to detect, track movement of, locate and/or identify users, and/or determine any other suitable information regarding a user within the device's detectable range. For example, a user may enable biometric recognition capabilities by activating settings or, alternatively, disable biometric recognition capabilities by deactivating settings.

Accordingly, the media system can be enriched with detection capabilities that can be processed for users with disabilities to gain access to all functions of the media system with the same level of convenience as non-disabled users, e.g., by activating accessibility features for user disabilities based on the detection and/or user profile.

In example embodiments, the media system can identify one or more users having a user profile in the user profile database. In some embodiments, a user may be identified based on image recognition, e.g., facial recognition, or based on audio recognition, e.g., speech recognition. In some embodiments, when the media system is unable to map a detected user with any user profile within the user profile database, the media system may determine to automatically create a new user profile for that user. In some embodiments, a newly detected user may be prompted to add a new user profile. In some embodiments, the user profile database can be fed with basic information and/or biometric data of users, e.g., a household. This can be provided upon installation of the media guidance application and/or input manually by the user. In example embodiments, the user profile database can be stored locally and/or remotely.

For example, when a new media system is installed at a user's home or office, the system may prompt the user to create one or more user profiles. The media system may prompt the user to input or edit user profile data, for example, by asking basic information such as name, age, height, disability type, and/or preference. In some embodiments, a facial scan may be requested by the system for more accurate user detection. It will be appreciated that user profiles can be edited, created or removed at a later instance.

Currently, as the need for inclusivity increases within the media industry, accessibility features are typically present as a feature of media systems. Accessibility features may include, e.g., embedded or integrated described video narrative (DV). DV is a narrated description of a program's non-verbal elements that may include setting, action, costumes, and body language, for example. Description may be added during pauses in dialogue and sound effects and can enable people to form a mental understanding and picture of what is happing in the media asset and can help visually impaired users to have a more fulfilling viewing experience.

In some embodiments, the user may require accessibility features to be active to enhance the user's content-viewing experience. For example, if it is determined that the detected user has a visual impairment, it may be further determined that he/she will need one or more accessibility features to access and enjoy various media content. For example, the user may be provided with a talkback feature to interact with the system. Accessibility features can be enabled as soon as the person is detected by the media system or upon confirmation by the user. In another example, if it is determined that the detected user has a hearing impairment, the output audio may be increased in volume or be directed to a specific sound source.

For visually impaired users, talkback or magnification of content may be enabled. For hearing or speaking impairment, subtitling and/or sign language may be enabled. For a user with a physical disability, talkback or any other accessibility feature may be enabled as applicable. For short stature, automatic lowering of the screen may be activated. In some embodiments, to accommodate for a plurality of users, the detection mechanism may detect the height of all users and determine an average height suitable for automatic lowering of the screen for an immersive user experience for all users detected by the media device. Further accessibility features may include custom magnification, adaptable screen reader, and/or automatic description of content, and (live or prerecorded) captioning.

It will be appreciated that any combination of accessibility features may be activated, as applicable. It will also be appreciated that, for any accessibility feature to be activated, the accessibility feature must be present in the system. In example embodiments, based on the configuration, the media system can enable any or all accessibility features required by any one or more disabled users detected within the detection region of the media device.

In some embodiments, relevant accessibility features may be automatically determined based on a user's profile and a database of accessibility features, for example. For example, the media system may automatically map accessibility features with one or more disabilities as applicable, based on a database of accessibility features. Additionally or alternatively, the relevant accessibility features may be determined based on the detection of one or more disabilities, e.g., using image or audio recognition. In some embodiments, one or more user profiles or one or more of the accessibility features may be prioritized for automatic activation of accessibility features.

In some embodiments, upon determining relevant accessibility features, one or more accessibility features may be automatically activated by the media system. In some embodiments, upon determining relevant accessibility features for a user, a prompt may be generated to the user for confirmation of whether to activate the accessibility features, rather than enabling them automatically.

In some embodiments, accessibility features may be selected manually or in response to a prompt generated by the media system. For example, the user may manually select which accessibility features they wish to automatically be activated upon media content discovery and media content generation or upon turning on the media device. Additionally, or alternatively, the user of the user profile may manually select which accessibility features they wish to be prompted to request the user for user input to confirm that they would like to proceed with activating the accessibility features.

In example embodiments, the accessibility features can be activated or deactivated through the settings of the media system. For example, a first set of settings associated with a first user may be applied when the first user is detected to be within the detection region and content may be provided on the media device based on the settings associated with the first user. Additionally, at a later instance, a second user may also be determined to be within the detection region. Second settings associated with the second user may also be applied to the media device.

In some embodiments, the settings associated with the first user and second user may be combined to create a third set of settings upon which the media content may be provided to the users. In further embodiments, it may be determined, using the detection mechanism, that the first user is no longer within the detection region of the media system. In response to such a change, the third set may then be modified such that it is based on settings associated with the one or more users who remain within detection regions, e.g., changed to apply the settings associated with the second user only.

In some embodiments, media content generated on a media device may be changed if it is determined that one or more properties of the media content conflict with the settings that are associated with a detected user. For example, settings associated with a first user may be compared with the properties of a first media asset. The first media asset may then be changed to a second media asset, in response to the determined conflict, the second media asset having properties that agree with the first user's settings. Additionally, or alternatively, the device may recommend media content based on the one or more other users detected by the detection mechanism.

In one approach, media content may be recommended and provided to users based on other content consumed by the users, e.g., based on viewing habits of one or more of the users. In another approach, a user may be permitted to scroll through various recommended content items in order to locate a content item he/she is interested in. Additionally, or alternatively, recommended content may be selected to match user preferences, e.g., based on user profiling, such as by ensuring that accessibility features required by one or any of the users are capable of being activated for the recommended content.

In some embodiments, content recommended to users may be determined based on the detection of users within the detection region of the detection mechanism, or within the vicinity of the media device. In some embodiments, the content recommendation module may determine, for example, detected emotion. Emotion detected, e.g., using a facial recognition or a body language detection system, may be used as an indicator of whether the user is interested in the initial recommended media asset. Media content may comprise metadata, e.g., identifiers, which can be associated with user emotion.

In some embodiments, the content recommendation module may store in memory a table of facial characteristics and corresponding emotional indicators, and detecting the emotional indicator based on the one or more captured images may comprise identifying facial characteristics of a face of the user in the one or more captured images; comparing the identified facial characteristics to the stored facial characteristics; determining, based on the comparison, whether the identified facial characteristics match the stored facial characteristics; and in response to determining that the identified facial characteristics match the stored facial characteristics, determining the emotional indicator of the user is the emotional indicator that corresponds to the matched facial characteristic.

In some embodiments, when multiple users are interacting with the media system, the content may be tailored to only one of those users in traditional cases, e.g., the user who affirmatively logged into the device. In some embodiments, the content may be tailored to only a specific group of users. For example, content recommended to user A and user B independently may be different from content recommended to user A and user B when users A and B are together. In this way, accessible media content may be recommended to a group of detected users, wherein one or more users are acknowledged by the media system to have a disability based on one or more group preferences between users.

For example, group preferences may comprise requesting confirmation from the first user and/or the one or more additional users to activate one or more of the one or more accessibility features and/or automatically activating one or more of the one or more accessibility features. For example, a request for confirmation may be generated to the user as a prompt or notification. Group preferences may be automatically determined or manually defined.

The disclosure provided herein may provide an innovative solution necessary for removing barriers to spoken communication on television and the Internet, for example.

Figure 3:
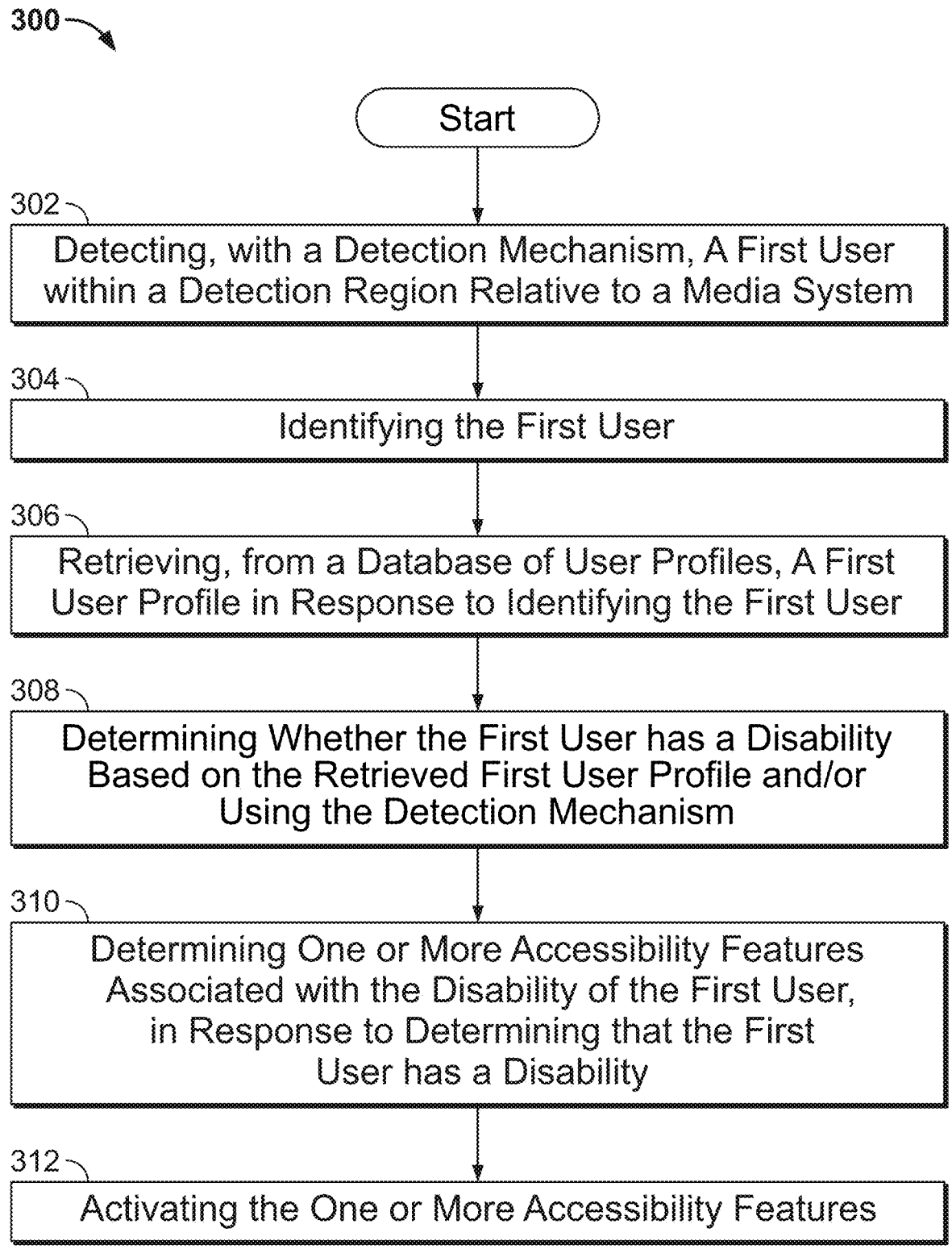
FIG. 3 is a flowchart of illustrative steps involved in a process for providing accessible media content to at least one user with a disability, in accordance with some embodiments of the present disclosure.

FIG. 3 is a flowchart of illustrative steps involved in a process for providing accessible media content to at least one user with a disability, in accordance with some embodiments of the present disclosure.

It should be noted that process 300 or any step thereof could be performed on, or provided by, any of the devices shown in FIGS. 1-2. For example, process 300 may be executed by control circuitry 104 (FIG. 1) as implemented on user equipment 202, 204, and/or 206 (FIG. 2). In addition, one or more steps of process 300 may be incorporated into or combined with one or more steps of any other process or embodiment disclosed herein.

At step 302, the system detects, with a detection mechanism, a first user within a detection region relative to a media system. For example, the detection region for the media system having the detection mechanism may be defined as a region within a detectable range, and wherein the detection region is smaller than the detectable range. In some embodiments, the parameters of the detection region for the media device may be stored in a database for the detection mechanism.

At step 304, the system identifies the first user. In some embodiments, a user may be identified based on image recognition, e.g., facial recognition, or based on audio recognition, e.g., speech recognition.

At step 306, the system retrieves, from a database of user profiles, a first user profile in response to identifying the first user. For example, the identified user can be matched against the user profile database to retrieve the user's profile.

At step 308, the system determines whether the first user has a disability based on the retrieved first user profile and/or using the detection mechanism.

At step 310, the system, in response to determining that the first user has a disability, determines one or more accessibility features associated with the disability of the first user. In some embodiments, the step of determining one or more accessibility features associated with the disability for the first user may be based on the retrieved first user profile and/or a database of accessibility features.

At step 312, the system activates the one or more accessibility features. For example, if a person is watching television alone, the required accessibility features may be directly enabled upon detection of any such profile or user.

Figure 4:
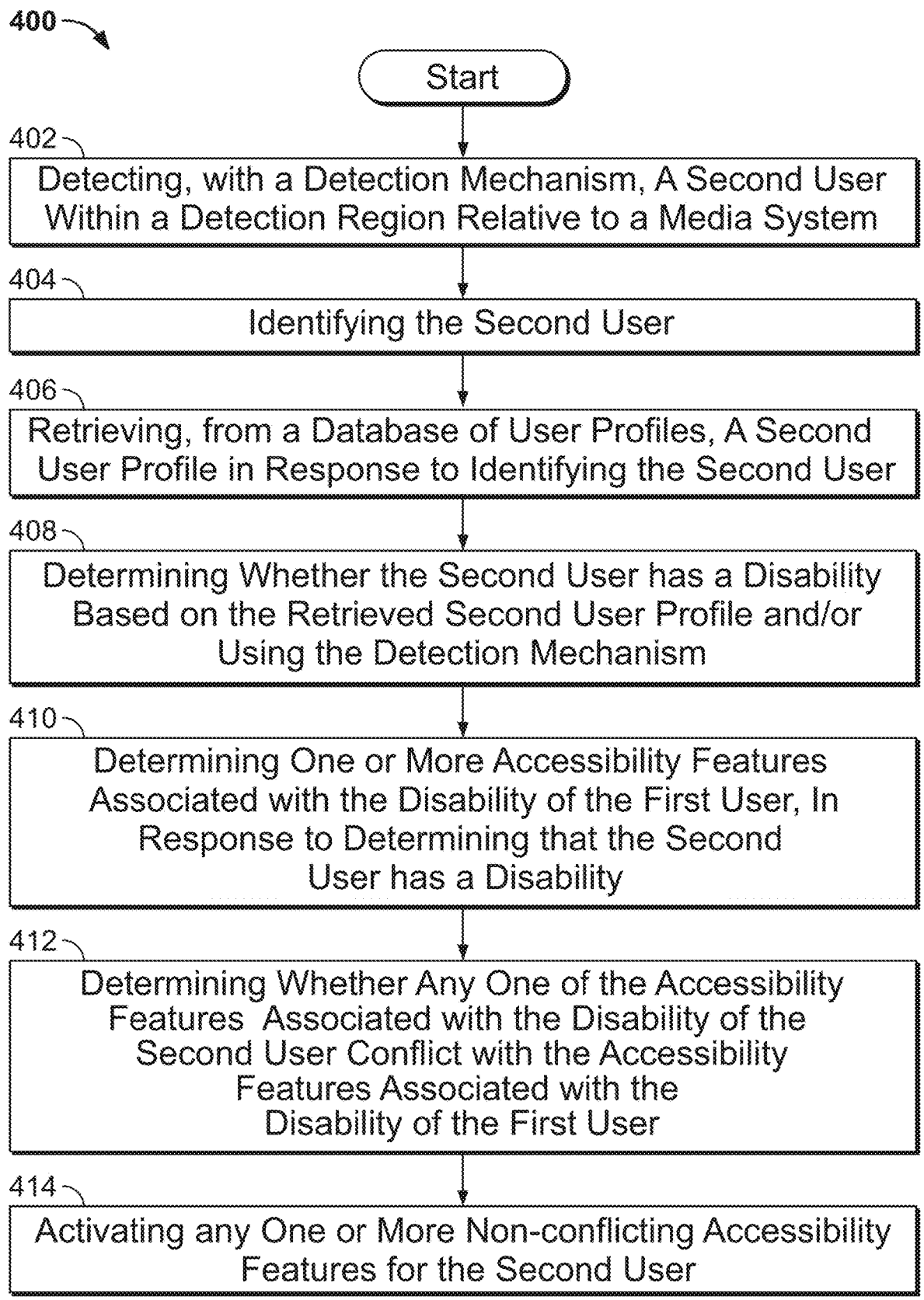
FIG. 4 is a flowchart of illustrative steps involved in a process for providing accessible media content to a plurality of users with disabilities, in addition to the process of FIG. 3, in accordance with some embodiments of the present disclosure.

FIG. 4 is a flowchart of illustrative steps involved in a process for providing accessible media content to a plurality of users with disabilities, in addition to the process of FIG. 3, in accordance with some embodiments of the present disclosure.

It should be noted that process 400 or any step thereof could be performed on, or provided by, any of the devices shown in FIGS. 1-2. For example, process 400 may be executed by control circuitry 104 (FIG. 1) as implemented on user equipment 202, 204, and/or 206 (FIG. 2). In addition, one or more steps of process 400 may be incorporated into or combined with one or more steps of any other process or embodiment disclosed herein.

At step 402, the system detects, with a detection mechanism, a second user within a detection region relative to a media system. For example, the detection region for the media system having the detection mechanism may be defined as a region within a detectable range, and wherein the detection region is smaller than the detectable range. In some embodiments, the parameters of the detection region for the media device may be stored in a database for the detection mechanism.

At step 404, the system identifies the second user. In some embodiments, a user may be identified based on image recognition, e.g., facial recognition, or based on audio recognition, e.g., speech recognition.

At step 406, the system retrieves, from a database of user profiles, a second user profile in response to identifying the second user. For example, the identified user can be matched against the user profile database to retrieve the user's profile.

At step 408, the system determines whether the second user has a disability based on the retrieved second user profile and/or using the detection mechanism.

At step 410, the system, in response to determining that the second user has a disability, determines one or more accessibility features associated with the disability of the first user. In some embodiments, the step of determining one or more accessibility features associated with the disability for the first user may be based on the retrieved first user profile and/or a database of accessibility features.

At step 412, the system determines whether any one of the accessibility features associated with the disability of the second user conflicts with the accessibility features associated with the disability of the first user.

At step 414, the system activates any one or more non-conflicting accessibility features for the second user. In other words, the media system may enable all of the required accessibility features for the plurality of users with disabilities.

In example embodiments, a media asset may be generated for display on a media device, the media asset having one or more activated accessibility features.

Figure 5:
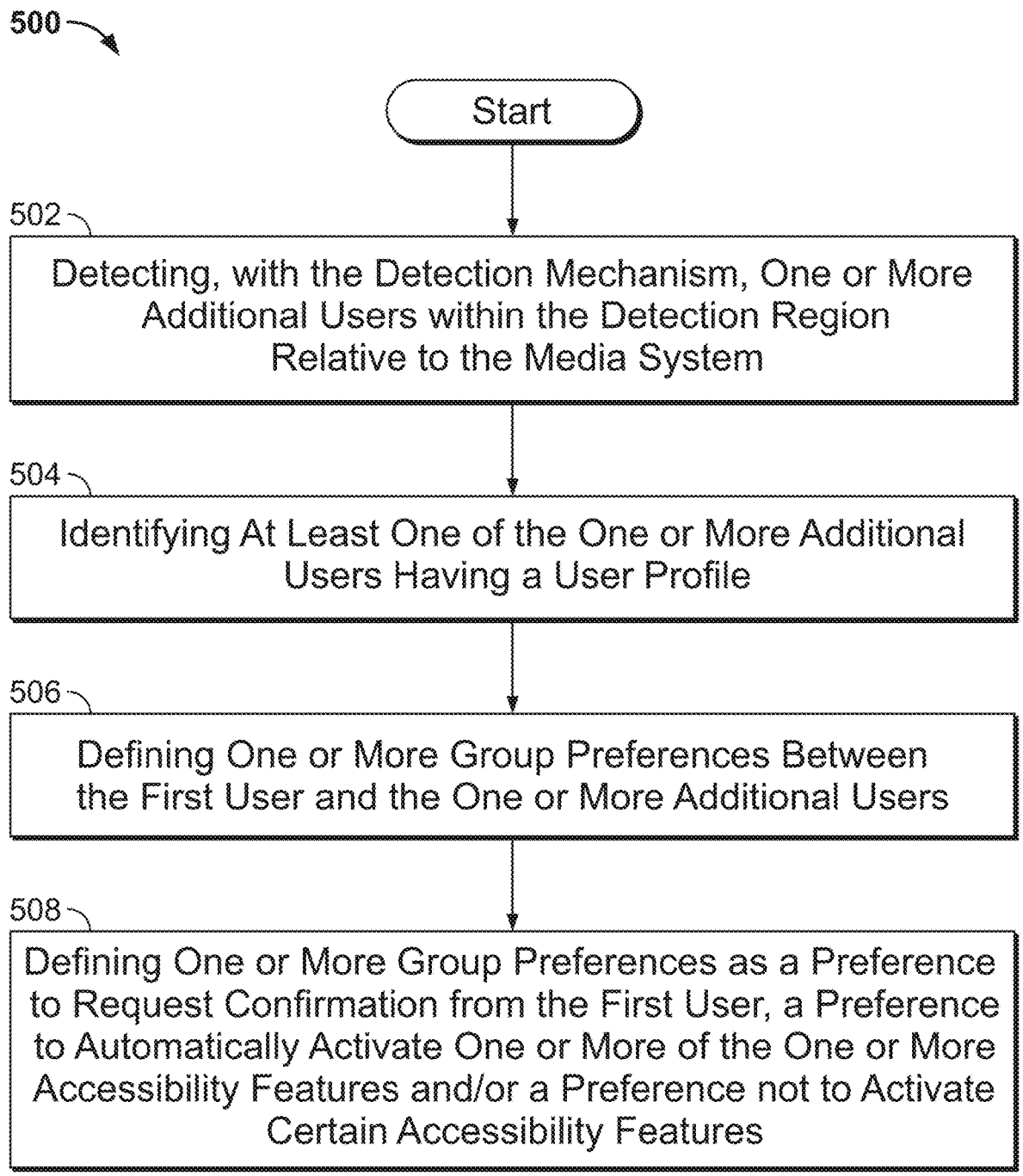
FIG. 5 is a flowchart of illustrative steps involved in a process for recommending accessible media content to a group of detected users, wherein one or more users are acknowledged by the media system to have a disability, in accordance with some embodiments of the present disclosure.

FIG. 5 is a flowchart of illustrative steps involved in a process for recommending accessible media content to a group of detected users, wherein one or more users are acknowledged by the media system to have a disability, in accordance with some embodiments of the present disclosure.

It should be noted that process 500 or any step thereof could be performed on, or provided by, any of the devices shown in FIGS. 1-2. For example, process 500 may be executed by control circuitry 104 (FIG. 1) as implemented on user equipment 202, 204, and/or 206 (FIG. 2). In addition, one or more steps of process 500 may be incorporated into or combined with one or more steps of any other process or embodiment disclosed herein.

At step 502, the system detects, with the detection mechanism, one or more additional users within the detection region relative to the media system.

At step 504, the system identifies at least one of the one or more additional users having a user profile.

At step 506, the system defines one or more group preferences between the first user and the one or more additional users.

At step 508, the system defines one or more group preferences as a preference to request confirmation from the first user and/or a preference to automatically activate one or more of the one or more accessibility features and/or a preference not to activate certain accessibility features. For example, a request for confirmation may be generated to the user as a prompt or notification. In some embodiments, one or more user profiles or one or more of the accessibility features may be prioritized for automatic activation.

The system may further recommend alternative media assets based on the one or more accessibility features or the one or more group preferences. For example, the step of recommending alternative media assets may be based on previously consumed media assets when the one or more accessibility features were active. Additionally, or alternatively, the recommendation of content may be based on user profiles, e.g., using user preferences.

In will be appreciated that the media guidance application may perform one or more of the functions described above simultaneously.

As referred herein, the term, "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Additionally, any of the steps in said processes can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method for providing accessible media content to users with disabilities, the method comprising:
   detecting, with a detection mechanism, a first user within a detection region relative to a media system;
   identifying the first user;
   determining that the first user has a disability using the detection mechanism;
      determining one or more media asset accessibility features associated with the disability of the first user; and
   operating a media guidance application to:
      generate a first list of recommended media assets for the first user based on media assets consumed by other users;
      filter the first list to generate a second list by selecting disability-appropriate media assets from the first list for which the one or more media asset accessibility features associated with the disability of the first user are available;
      generate for audio or visual or audiovisual output a recommendation of at least one of the media assets in the second list to the first user;
      receive from the first user a first selection of a first disability-appropriate media asset recommended to the first user; and
      generate the selected first disability-appropriate media asset with the one or more media asset accessibility features automatically enabled for output to the first user;
      receive a second selection of a disability-appropriate media asset recommended to the first user;
      detect, with the detection mechanism, one or more additional users within the detection region relative to the media system;
      determine one or more group preferences between the first user and the one or more additional users, the one or more group preferences comprising a preference not to activate certain accessibility features; and
      generating the second selected disability-appropriate media asset for output to the first user without activating the certain accessibility features.

2. The method of claim 1, further comprising:
   defining the detection region for the media system having the detection mechanism, wherein the detection region is within a detectable range, and wherein the detection region is smaller than the detectable range; and
   storing parameters of the detection region for the media system.

3. The method of claim 1, wherein the step of determining one or more media asset accessibility features associated with the disability for the first user is based on a retrieved first user profile or a database of media asset accessibility features.

4. The method of claim 1, further comprising:
   identifying at least one of the one or more additional users having a user profile.

5. The method of claim 4, further comprising recommending alternative media assets based on the one or more media asset accessibility features or the one or more group preferences.

6. The method of claim 5, wherein recommending alternative media assets is based on previously consumed media assets when the one or more media asset accessibility features were active.

7. The method of claim 1 further comprising operating the media system to receive a media asset via a communications path.

8. A system for providing accessible media content to users with disabilities, the system comprising control circuitry configured to:
   detect, with a detection mechanism, a first user within a detection region relative to a media system;
   identify the first user;
   determine that the first user has a disability using the detection mechanism;
      determine one or more media asset accessibility features associated with the disability of the first user; and
   operate a media guidance application to:
      generate a first list of recommended media assets for the first user based on media assets consumed by other users;
      filter the first list to generate a second list by selecting disability-appropriate media assets from the first list for which the one or more media asset accessibility features associated with the disability of the first user are available;
      generate for audio or visual or audiovisual output a recommendation of at least one of the media assets in the second list to the first user;

receive from the first user a first selection of a first disability-appropriate media asset recommended to the first user;

generate the selected first disability-appropriate media asset with the one or more media asset accessibility features automatically enabled for output to the first user;

receive a second selection of a disability-appropriate media asset recommended to the first user;

detect, with the detection mechanism, one or more additional users within the detection region relative to the media system;

determine one or more group preferences between the first user and the one or more additional users, the one or more group preferences comprising a preference not to activate certain accessibility features; and generate the second selected disability-appropriate media asset for output to the first user without activating the certain accessibility features.

9. The system of claim 8, wherein the control circuitry is further configured to:

define the detection region for the media system having the detection mechanism, wherein the detection region is within a detectable range, and wherein the detection region is smaller than the detectable range; and store parameters of the detection region for the media system.

10. The system of claim 8, wherein determining one or more media asset accessibility features associated with the disability for the first user is based on a retrieved first user profile or a database of media asset accessibility features.

11. The system of claim 8, wherein the control circuitry is further configured to identify at least one of the one or more additional users having a user profile.

12. The system of claim 11, wherein the control circuitry is further configured to recommend alternative media assets based on the one or more media asset accessibility features.

13. The system of claim 12, wherein recommending alternative media assets is based on previously consumed media assets when the one or more media asset accessibility features were active.

14. The media system of claim 8 wherein the control circuitry is further configured to receive a media asset via a communications path.

15. A non-transitory computer-readable medium comprising non-transitory computer-readable instructions encoded thereon for operating a media system to provide accessible media content to users with disabilities, the instructions comprising:

instructions for detecting, with a detection mechanism, a first user within a detection region relative to a media system;

instructions for identifying the first user;

instructions for determining that the first user has a disability using the detection mechanism;

instructions for determining one or more media asset accessibility features associated with the disability of the first user;

instructions for operating a media guidance application to:

generate a first list of recommended media assets for the first user based on media assets consumed by other users;

filter the first list to generate a second list by selecting disability-appropriate media assets from the first list for which the one or more media asset accessibility features associated with the disability of the first user are available;

generate for audio or visual or audiovisual output a recommendation of at least one of the media assets in the second list to the first user;

receive from the first user a first selection of a first disability-appropriate media asset recommended to the first user; and generate the selected disability-appropriate media asset with the one or more media asset accessibility feature automatically enabled for output to the first user;

receive a second selection of a disability-appropriate media asset recommended to the first user;

detect, with the detection mechanism, one or more additional users within the detection region relative to the media system;

determine one or more group preferences between the first user and the one or more additional users, the one or more group preferences comprising a preference not to activate certain accessibility features; and generate the second selected disability-appropriate media asset for output to the first user without activating the certain accessibility features.

16. The non-transitory computer-readable medium of claim 15, further comprising:

instructions for operating the media system to:

define the detection region for the media system having the detection mechanism, wherein the detection region is within a detectable range, and wherein the detection region is smaller than the detectable range; and store parameters of the detection region for the media system.

17. The non-transitory computer-readable medium of claim 15 further comprising instructions for operating the media system to receive a media asset via a communications path.

* * * * *